(12) United States Patent
Sun et al.

(10) Patent No.: US 8,199,025 B2
(45) Date of Patent: Jun. 12, 2012

(54) BALL-ROLLING TYPE ORIENTATION SENSOR

(75) Inventors: Tsung-Ting Sun, Chung-Ho (TW); Chung-Ping Feng, Chung-Ho (TW)

(73) Assignee: Edison Opto Corporation, Taipei (TW)

( * ) Notice: Subject to any disclaimer, the term of this patent is extended or adjusted under 35 U.S.C. 154(b) by 444 days.

(21) Appl. No.: 12/627,217

(22) Filed: Nov. 30, 2009

(65) Prior Publication Data

US 2011/0128156 A1    Jun. 2, 2011

(51) Int. Cl.
*G08B 21/00* (2006.01)

(52) U.S. Cl. .................. 340/689; 340/686.1; 348/208.3; 348/208.1

(58) Field of Classification Search .................. 340/689, 340/686.1; 250/23.9, 200, 231.1; 73/514.26; 396/52, 55, 421; 348/E5.055, 208.3, 208.2, 348/208.1

See application file for complete search history.

(56) References Cited

FOREIGN PATENT DOCUMENTS

TW    I313349    8/2009

*Primary Examiner* — Jennifer Mehmood
*Assistant Examiner* — Hongmin Fan
(74) *Attorney, Agent, or Firm* — Chun-Ming Shih; HDLS IPR Services (57) ABSTRACT

A ball-rolling type orientation sensor includes a housing, a light emitter, two light receivers, and a rolling ball. The housing has a ring-shaped tunnel and a first opening connecting to the tunnel and two second openings respectively located on two sides of the first opening. The light emitter is arranged at the first opening and emitting light into the tunnel through the first opening. The light receivers are respectively arranged at the second openings and receiving light from the tunnel through the second openings. The rolling ball is arranged in the tunnel, whereby while the ball-rolling type orientation sensor is tilting, the rolling ball rolls toward the direction of gravity force, a portion of light emitted from the light emitter is reflected to one of the light receivers by the rolling ball, the light receivers respectively receive light with predetermined intensities and correspondingly output electric signals with predetermined strengths.

9 Claims, 8 Drawing Sheets

BALL-ROLLING TYPE ORIENTATION SENSOR

BACKGROUND OF THE INVENTION

1. Field of the Invention

The present invention relates to a sensor, in particular to a ball-rolling type orientation sensor.

2. Description of Related Art

As the popularization of the portable electronic apparatuses like digital cameras or camera phones, it has become normal to watch pictures on the screen of them. Therefore, a picture-rotating function which can rotate pictures on the screen while the apparatuses are rotating is gradually added into the portable electronic apparatuses.

Figure 1:
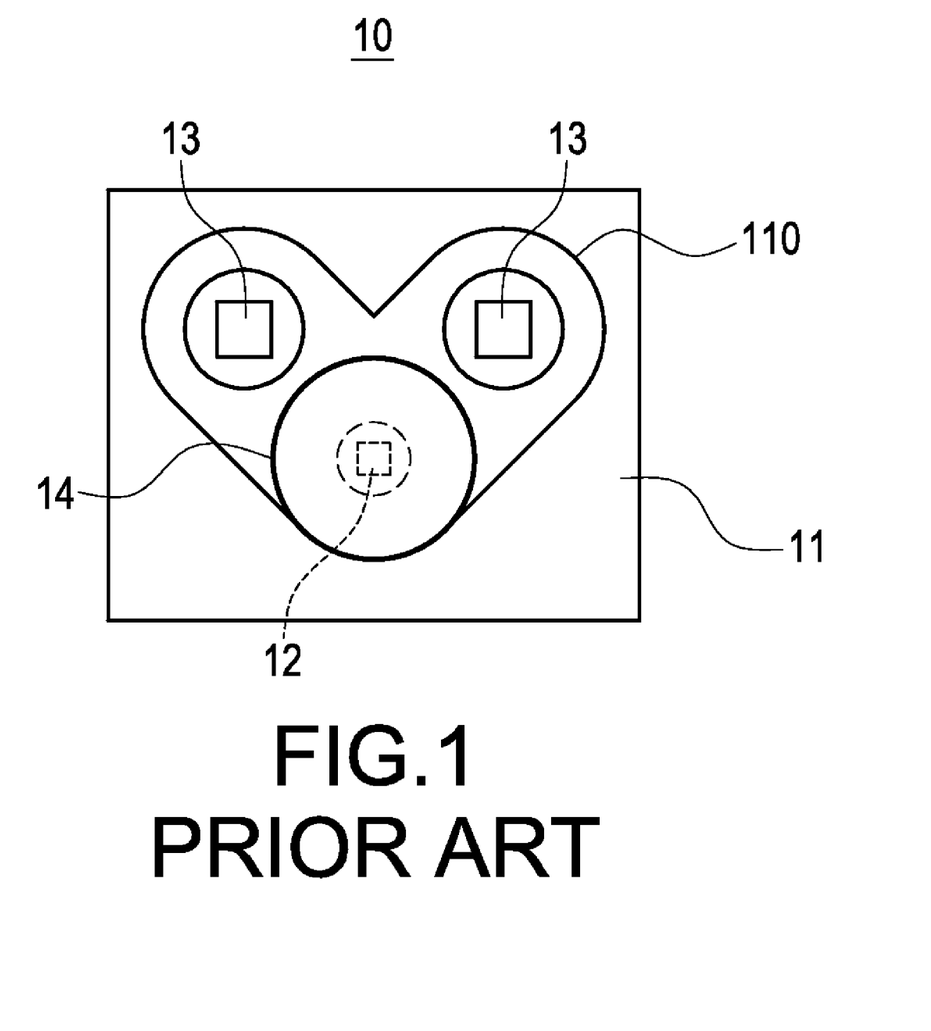
FIG. 1 is a schematic view of a conventional tilt sensor.

Refer to FIG. 1, a conventional tilt sensor 10 is disclosed by the Taiwan patent application No. 95142815. The tilt sensor 10 is installed into the abovementioned apparatuses and can sense the rotation of the apparatuses. Then, the tilt sensor 10 can output corresponding signals for changing the display orientation of pictures. As FIG. 1 shows, the tilt sensor 10 includes a shell 11 having a V-shaped groove 110, a light emitting device 12 used for emitting light into the V-shaped groove 110, two light receivers used for receiving light from the V-shaped groove 110, and a sliding member 14 used for sliding in the V-shaped groove 110. While the tilt sensor 10 is clockwise or counterclockwise rotated relative to the direction of gravity, the sliding member 14 is going to slide from the central lower position toward the two upper sides of the V-shaped groove 110.

When the sliding member 14 is located at the central lower position of the V-shaped groove 110, the sliding member 14 blocks the light emitting device 12 from emitting light into the V-shaped groove. Then, the light receivers 13 sense no light from the V-shaped groove 110. When the sliding member 14 is located at either upper side of the V-shaped groove 110, the sliding member 14 blocks one of the light receivers 13 so that the light receiver 13 can not receive light from the V-shaped groove 110, but the other light receiver 13 can receive light without any affection. Therefore, the tilt sensor 10 can output a corresponding signal to control the display orientation of pictures.

However, since the sliding member 14 is only able to move between the central lower position, the left upper side or right upper side 14, which means that only three kinds of signals can be outputted by the tilt sensor 10. It will limit the applications of the tilt sensor 10. For example, such a tilt sensor 10 can switch the display orientations of the pictures at three positions of a predetermined angle, 90 degrees counterclockwise and 90 degrees clockwise. But, the display orientations of the pictures can not be changed in a continuous way while the portable electronic apparatus is continuously changing its tilting angle.

SUMMARY OF THE INVENTION

The purpose of the present invention is to provide a ball-rolling type orientation sensor which can continuously change its outputted electric signal while tilt angle or rotation angle thereof is varying continuously. Such that the ball-rolling type orientation sensor can provide more possibilities in applications.

In order to achieve aforementioned purpose, the present invention provides a ball-rolling type orientation sensor including a housing, a light emitter, two light receivers, and a rolling ball. The housing has a ring-shaped tunnel and a first opening connecting to the tunnel and two second openings respectively located on two sides of the first opening. The light emitter is arranged at the first opening and emits light into the tunnel through the first opening. The light receivers are respectively arranged at the second openings and receive light from the tunnel through the second openings. The rolling ball is arranged in the tunnel. While the ball-rolling type orientation sensor is tilted, the rolling ball rolls toward the direction of gravity force, a portion of light emitted from the light emitter is reflected to one of the light receivers by the rolling ball. The light receivers respectively receive light with predetermined intensities and correspondingly output electric signals with predetermined strengths.

BRIEF DESCRIPTION OF THE DRAWINGS

The features of the invention believed to be novel are set forth with particularity in the appended claims. The invention itself however may be best understood by reference to the following detailed description of the invention, which describes certain exemplary embodiments of the invention, taken in conjunction with the accompanying drawings in which:

DETAILED DESCRIPTION OF THE INVENTION

A detailed description of the present invention will be made with reference to the accompanying drawings.

Figure 2:
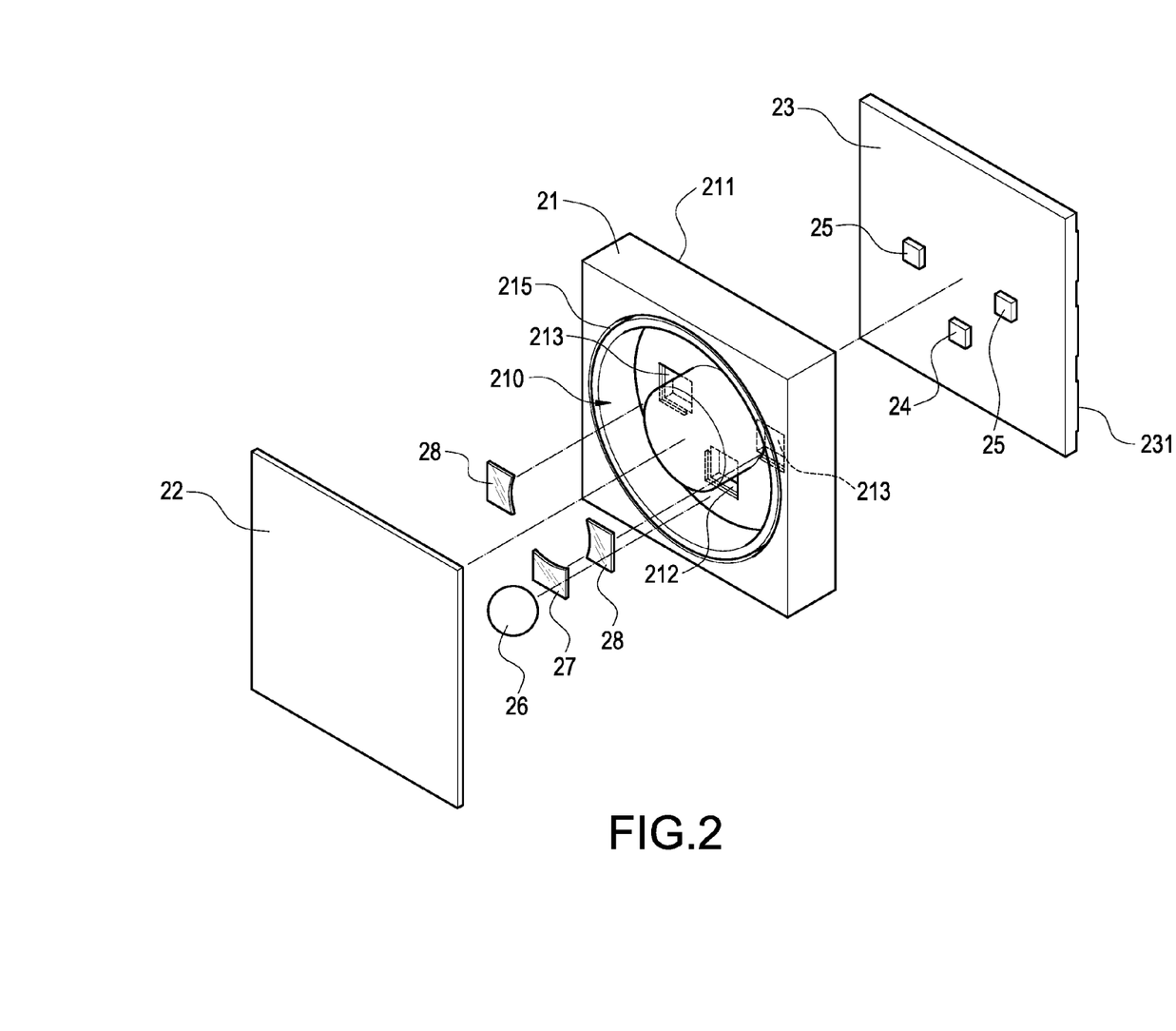
FIG. 2 is a schematic view of the ball-rolling type orientation sensor according to first embodiment of the present invention.
Figure 3:
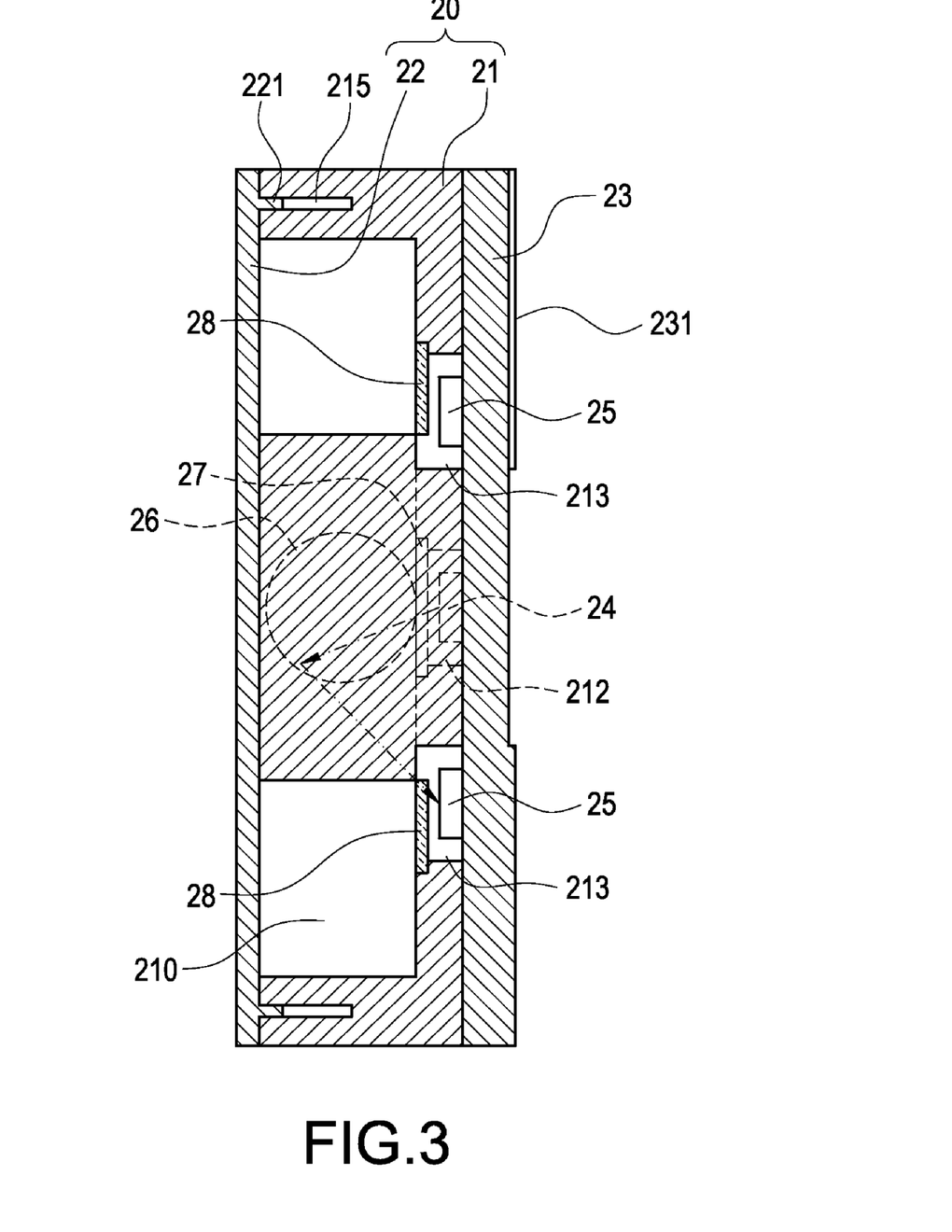
FIG. 3 is a cross-sectional view of the ball-rolling type orientation sensor in FIG. 2.

FIG. 2 and FIG. 3 show a ball-rolling type orientation sensor according to first embodiment of the present invention. The ball-rolling type orientation sensor mainly includes a housing 20, a circuit board 23, a light emitter 24, two light receivers 25 and a rolling ball 26.

The housing 20 includes a first housing portion 21 and a second housing portion 22. A ring-shaped tunnel 210 is formed by the first housing portion 21 and the second housing portion 22. In this embodiment, the tunnel 210 is circular, but not limited thereto in practical use. The first housing 21 has a surface 211 parallel to the extension direction of the tunnel 210. A first opening 212 and two second openings 213 are formed on the surface 211 and connect to the tunnel 210. The first opening 212 and the second openings 213 are arranged along the extension direction of the tunnel 210. The two second openings 213 are respectively located on two sides of the first opening 210.

Further more, a connecting line between the second openings 213 passes through the center of the tunnel 210. Besides, the distance between the first openings 212 and each of the second openings 213 are equal.

Besides, the second housing portion 22 has a circular protrusion 221 used for correspondingly embedding in the circular groove 215. Such that the second housing portion 22 can be fixed on the first housing portion 21.

The circuit board 23 is arranged on the surface 211 of the first housing portion 21. The circuit board 23 can be a printed circuit board or a flexible circuit board. Further more, a plurality of conductive terminals 231 are arranged on a surface of the circuit board 23, which is opposite to the first housing portion 21. The conductive terminals 231 extend to the front face of the circuit board 23 and connect with the light emitter 24 and the light receivers 25 through the exterior or interior of the circuit board 23. Such that an exterior electric power can be connected to the conductive terminals 231 and supply electric power to the light emitter 24 and light receivers 25 or the signals from the light receivers 25 can output through the conductive terminals 231.

The light emitter 24 is arranged on the circuit board 23 and is located at the first opening 212. The light emitter 24 emits light into the tunnel 210 through the first opening 212. In this embodiment, the light emitter 24 is a light emitting diode, but not limited thereto in practical use.

The light receivers 25 are arranged on the circuit board 23 and are located at the second openings 213. The light receivers 25 receive light from the tunnel 210 through the second openings 213. In this embodiment, the light receivers 25 are phototransistors, but not limited thereto in practical use.

The rolling ball 26 is correspondingly arranged in the tunnel 210 and can roll in the tunnel 210. Preferably, a high reflective coating is formed on the outer surface of the rolling ball 26.

Besides, in order to prevent that the rolling ball 26 falls into the first opening 212 or the second openings 213 while the rolling ball 26 is rolling. In this embodiment, one transparent plate 27 is added between the first opening 212 and the tunnel 210, and two transparent plates 28 are added between the second openings 213 and the tunnel 210.

Figure 4:
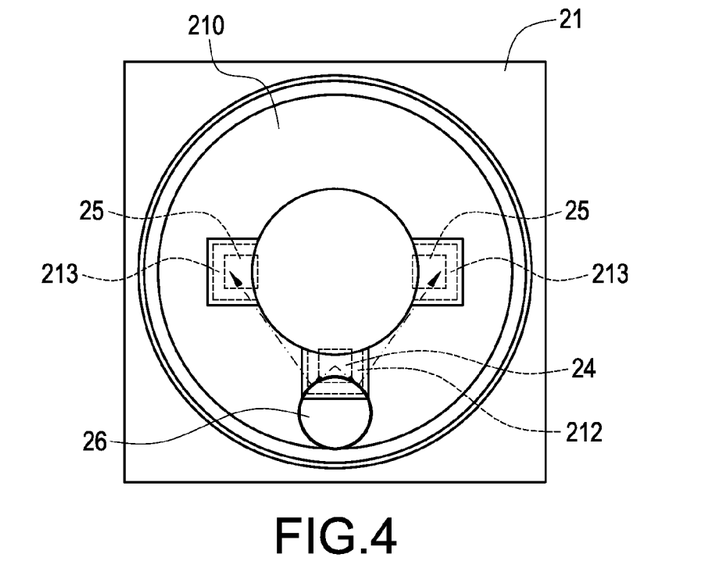
FIG. 4 to FIG. 10 are different operating views of the ball-rolling type orientation sensor.

FIG. 4 to FIG. 10 respectively illustrates several conditions while the ball-rolling type orientation sensor is operating. First, as FIG. 4 shows, the direction of the gravity force is downward. The rolling ball 26 is spontaneously located at the lower part of the tunnel 210 where the rolling ball 26 has the lowest potential energy. At this moment, the rolling ball 26 can reflect the light from the light emitter 24 to both the left and right sides light receivers 25, thus the light receivers 25 can respectively output corresponding signals, which is the first kind of signal combination outputted by the ball-rolling type orientation sensor.

Figure 5:
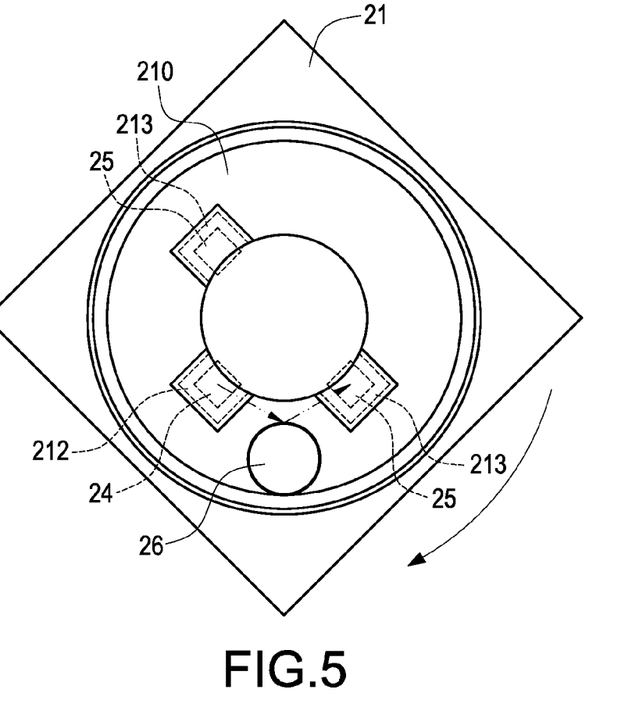

Refer to FIG. 5, the ball-rolling type orientation sensor is clockwise rotated with respect to FIG. 4. The rolling ball 26 can spontaneously move to the lower part of the tunnel 210. At this moment, the rolling ball 26 is far away from the left side light receiver 25 and is near to the right side light receiver 25. Light emitted from the light emitter 24 can not be reflected to the left side light receiver 25 by the rolling ball 26, but can be reflected to the right side light emitter 25 by the rolling ball 26. Besides, comparing to FIG. 4, the rolling ball 26 is farther from the light emitter 24 so that light reflected to the right side light receiver 25 by the rolling ball 26 is less. The light receivers 25 can output corresponding signals representing the light intensity they received. Those signals are the second kind of signal combination of the ball-rolling type orientation sensor.

Figure 6:
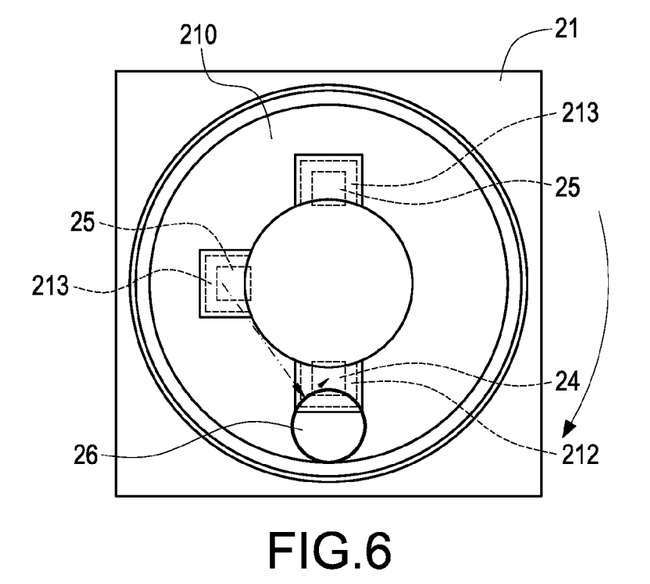
Figure 7:
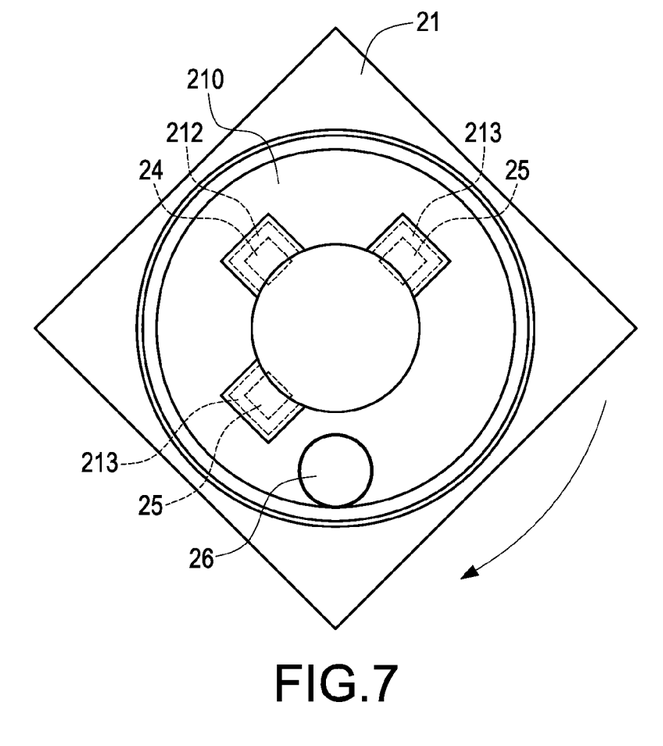
Figure 8:
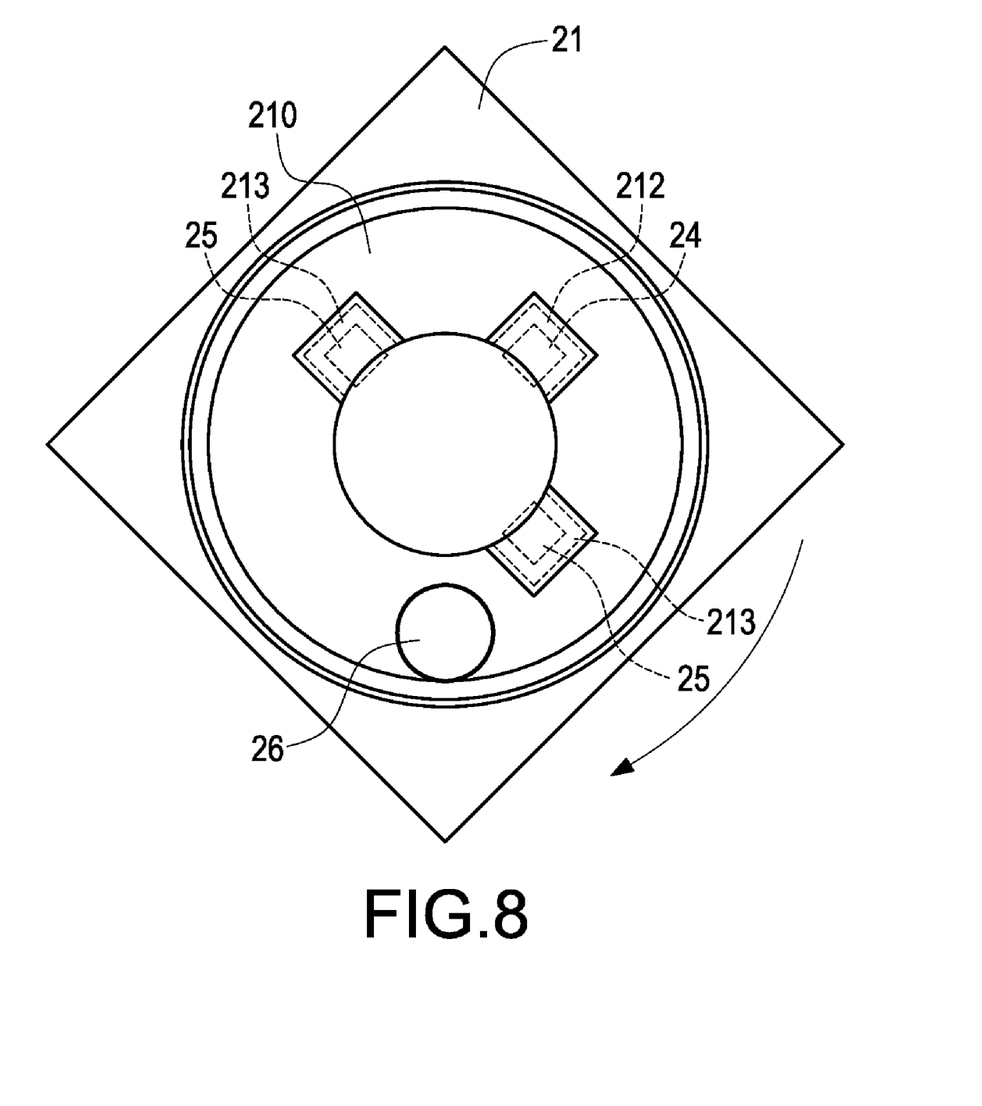
Figure 9:
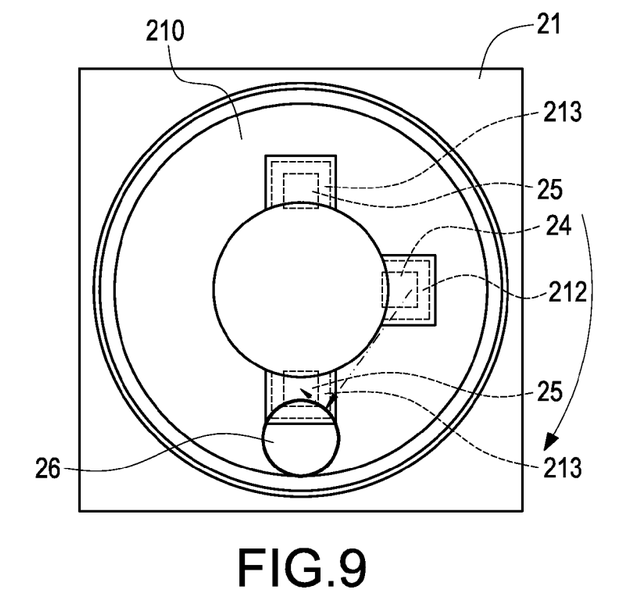
Figure 10:
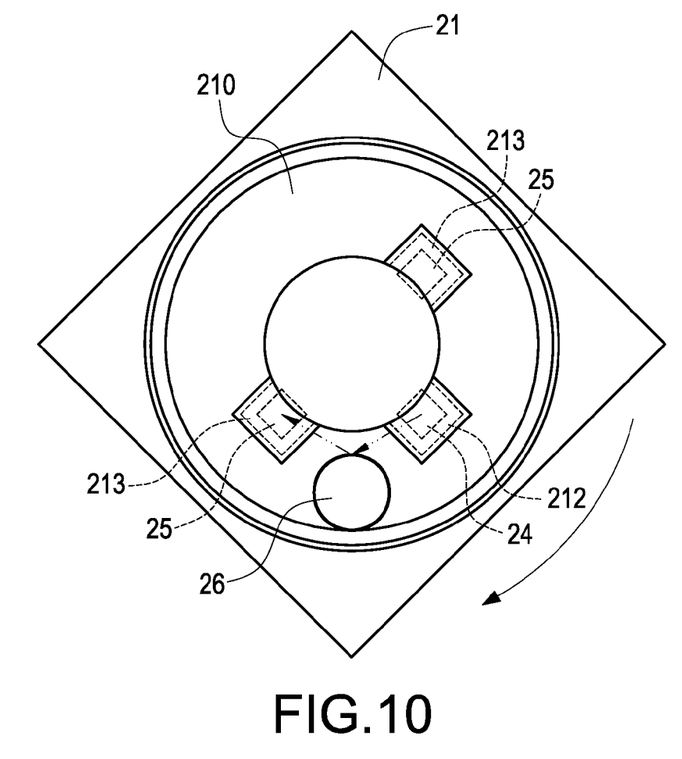

Refer to FIG. 6, the ball-rolling type orientation sensor is further clockwise rotated with respect to FIG. 5. The rolling ball 26 can spontaneously move to the lower part of the tunnel 210. At this moment, the rolling ball 26 is near to the lower side light receiver 25. Light from the light emitter 24 can not be reflected to the upper side light receiver 25, but can be reflected to the lower side light receiver 25 by the rolling ball 26. Comparing to FIG. 5, since the rolling ball 26 is even farther from the light emitter 24, the even less light is reflected to the lower light receiver 25 by the rolling ball 26. The light receivers 25 can output corresponding signals representing the light intensity they received. Those signals are the third kind of signal combination of the ball-rolling type orientation sensor.

In the same manner, the ball-rolling type orientation sensor in the situations of FIG. 7 to FIG. 10 can respectively output several kinds of signal combinations. Since the intensity of light received by the light receivers 25 is negatively related to the distance between the rolling ball 26 and the light emitter 24 and is able to continuous changed with the changing of the distance, the electric signals outputted by the light receivers 25 are changed in an analog way. Therefore, the ball-rolling type orientation sensor will not be limited in various applications. For example, when the portable electronic apparatus having the ball-rolling type orientation sensor is dynamically tilted or rotated, the picture displayed on the portable electronic apparatus can have various kinds of display orientations.

Figure 11:
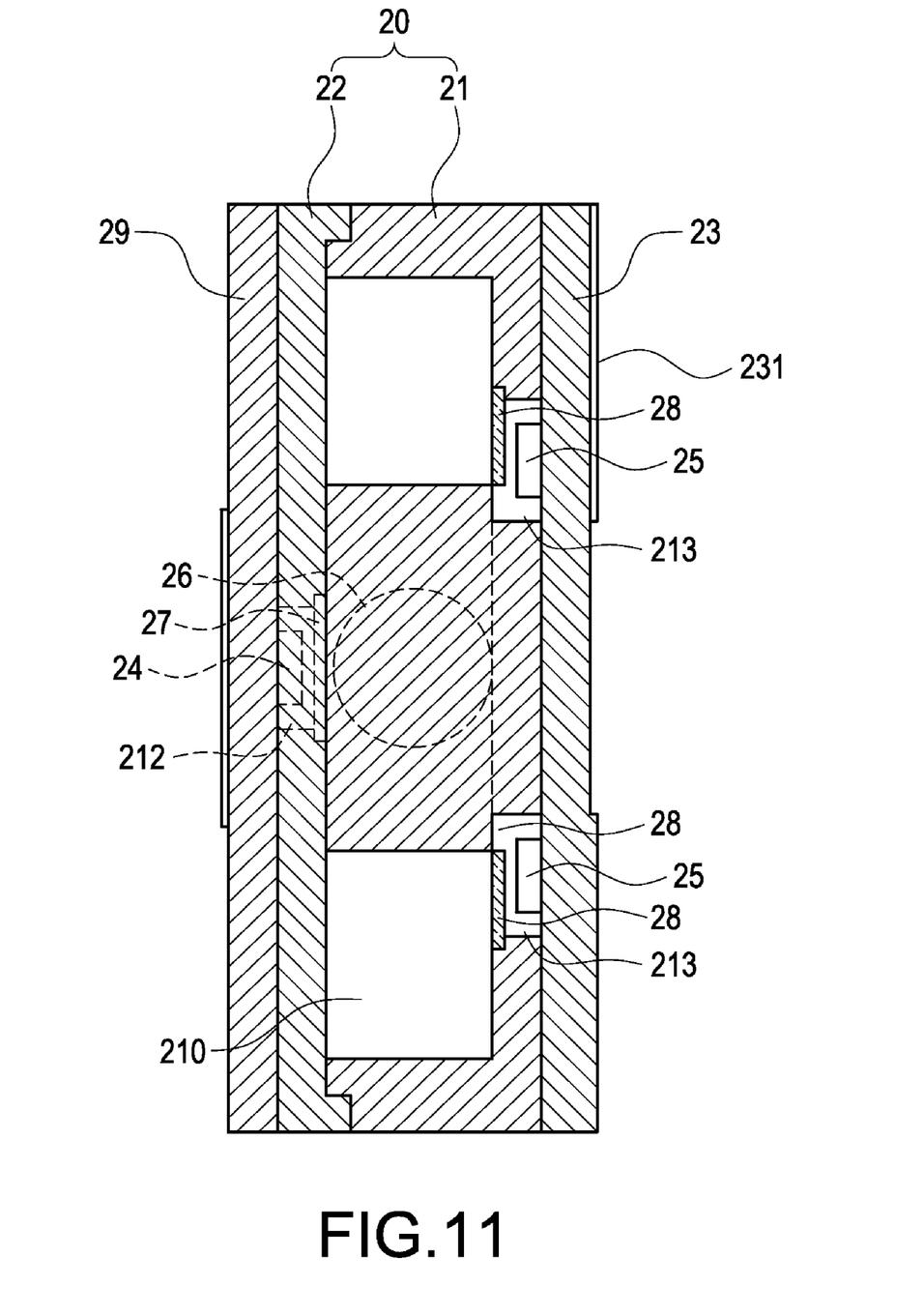
FIG. 11 is a cross-sectional view of the ball-rolling type orientation sensor according to second embodiment of the present invention.

FIG. 11 shows a ball-rolling type orientation sensor according to second embodiment of the present invention, which has structure similar to the first embodiment. The difference is that the light emitter 24 and the light receivers 25 are arranged at two opposite sides of the housing 20.

A circuit board 23 is arranged on a side of the first housing portion 21 of the housing 20 and used for carrying the light receivers 25. Another circuit board 29 is arranged on another side of the housing 20 and used for carrying the light emitter 24. Besides, the first opening 212 is formed on the second housing portion 22 and used for passing the light emitted from the light emitter 24 into the tunnel 210.

Although the present invention has been described with reference to the foregoing preferred embodiment, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A ball-rolling type orientation sensor, comprising:
   a housing having a ring-shaped tunnel and a first opening connecting to the tunnel and two second openings respectively located on two sides of the first opening and connecting to the tunnel;
   a light emitter arranged at the first opening and emitting light into the tunnel through the first opening;
   two light receivers respectively arranged at the second openings and receiving light from the tunnel through the second openings; and
   a rolling ball arranged in the tunnel, whereby while the ball-rolling type orientation sensor is tilting, the rolling ball rolls toward the direction of gravity force, a portion of light emitted from the light emitter is reflected to one of the light receivers by the rolling ball, the light receivers respectively receive light with predetermined intensities and correspondingly output electric signals with predetermined strengths.

2. The ball-rolling type orientation sensor according to claim 1, further comprising an circuit board arranged on a side of the housing and used for carrying the light emitter and the light receivers.

3. The ball-rolling type orientation sensor according to claim 1, further comprising an circuit board arranged on a side of the housing and used for carrying the light receivers, and another circuit board arranged on another side of the housing and used for carrying the light emitter.

4. The ball-rolling type orientation sensor according to claim 1, wherein the tunnel is circular.

5. The ball-rolling type orientation sensor according to claim 1, wherein a connecting line between the second openings passes through the center of the tunnel, and the distance between the first opening and each of the second openings are equal.

6. The ball-rolling type orientation sensor according to claim 2, wherein a plurality of conductive terminals are arranged on a surface of the circuit board, which is opposite to the housing.

7. The ball-rolling type orientation sensor according to claim 1, wherein the light emitter is a light emitting diode.

8. The ball-rolling type orientation sensor according to claim 1, wherein the light receivers are phototransistors.

9. The ball-rolling type orientation sensor according to claim 1, wherein a high reflective coating is formed on the outer surface of the rolling ball.

* * * * *